United States Patent
Han

(10) Patent No.: US 7,558,341 B2
(45) Date of Patent: Jul. 7, 2009

(54) CARRIER RECOVERY APPARATUS AND DIGITAL BROADCAST RECEIVER USING THE SAME

(75) Inventor: Jung Il Han, Goyang-si (KR)

(73) Assignee: LG Electronics Inc., Seoul (KR)

( * ) Notice: Subject to any disclaimer, the term of this patent is extended or adjusted under 35 U.S.C. 154(b) by 1002 days.

(21) Appl. No.: 11/002,878

(22) Filed: Dec. 1, 2004

(65) Prior Publication Data

US 2005/0141646 A1   Jun. 30, 2005

(30) Foreign Application Priority Data

Dec. 1, 2003   (KR) .................. 10-2003-0086427

(51) Int. Cl.
*H04L 27/00* (2006.01)
*H04L 27/22* (2006.01)

(52) U.S. Cl. .................. 375/326; 329/306

(58) Field of Classification Search .......... 375/224, 375/226, 227, 207, 308, 316, 326; 329/304, 329/306; 332/304, 306, 307, 308
See application file for complete search history.

(56) References Cited

U.S. PATENT DOCUMENTS

| 4,795,986 | A | * | 1/1989 | Ceroni et al. | 329/304 |
| 5,157,694 | A | * | 10/1992 | Iwasaki et al. | 375/327 |
| 5,471,508 | A | * | 11/1995 | Koslov | 375/344 |
| 5,815,535 | A | * | 9/1998 | Choi et al. | 375/344 |
| 6,671,339 | B1 | * | 12/2003 | Ahn | 375/346 |
| 7,415,083 | B2 | * | 8/2008 | Anderson | 375/345 |

* cited by examiner

*Primary Examiner*—Tesfaldet Bocure
(74) *Attorney, Agent, or Firm*—Lee, Hong, Degerman, Kang & Waimey

(57) ABSTRACT

Provided is a carrier recovery apparatus of an OOB QPSK receiver for an Open Cable System. The carrier recovery apparatus of the digital broadcast receiver includes a carrier recovery, an SNR calculator, a false lock generator, and an integrator. The carrier recovery receives a digital broadcast signal, multiplies the signal by a carrier frequency offset, and compensates a distorted phase before converting into a last bandwidth. The SNR calculator obtains an average in an interval determined by accumulating an inputted inter-symbol mean squared error (MSE) to calculate an SNR. The false lock detector receives the SNR calculated at the SNR calculator for its input to generate a false reset signal for preventing convergence from being performed to a false direction before converting into a last bandwidth of a lock detector. The integrator receives a false reset signal from the false lock detector, for its input to initialize a register of an integral part.

23 Claims, 6 Drawing Sheets

CARRIER RECOVERY APPARATUS AND DIGITAL BROADCAST RECEIVER USING THE SAME

This application claims the benefit of the Korean Application No. 10-2003-0086427, filed on Dec. 1, 2003, which is hereby incorporated by reference.

BACKGROUND OF THE INVENTION

1. Field of the Invention

The present invention relates to a broadcast receiver, and more particularly, to a carrier recovery apparatus for use in an OOB (out-of-band) receiver for an Open Cable System.

2. Discussion of the Related Art

Recently, digitalization of broadcast media is under rapid progress throughout the world and a digital broadcasting of a ground wave broadcasting and a satellite broadcasting has begun also in the country. In the county where more than 60% of the total television (TV) reception households are receiving a broadcasting through a wired network currently, an introduction of a digital system for a wired broadcasting is under active progress.

The Ministry of Information and Communication has propelled digitalization of a wired broadcasting since 1999 and selected an Open Cable Standard, which is an United States' standard, as a domestic digital wired broadcasting standard in 2001.

In the United States, the wired broadcasting occupies most largest portion in the whole broadcasting market but an equipment market for a related head end equipment and a set-top box is almost monopolized by two companies, which are Motorola, Scientific Atlanta. Thus, the United States is closed in viewpoint of the equipment market. To remove such closeness, the Unites States has prescribed that a part related to a limited reception should be separated from a set-top box from the coming year of 2005.

The Open Cable Standard prescribes that the set-top box should include a host from which a limited reception part is removed and a Point of Deployment (POD) including the limited reception part to meet Federal Communications Commission (FCC) regulations.

The Open Cable Standard requires the following functions:

First, a function for supporting FCC requirements, which include possibility of separating the limited reception function, purchasing of a subscriber terminal at a competitive market, compatibility with the existing digital wired broadcasting system.

Second, a function for supporting a performance parameter so that a network operation and audio and video qualities reach an acceptable level.

Third, a function for supporting a limited reception by a detachable POD.

Fourth, a function for supporting an out-of-band signaling. For Electronic Program Guide related service information, an Entitlement Management Message (EMM), a database, a predetermined band should be used.

Fifth, a function for supporting a high definition(HD) TV compression signal stream output using an Institute of Electrical and Electronics Engineers (IEEE) 1394 connection.

Sixth, a function for supporting a duplication meeting Motion Picture Association of America (MPAA) requirements for a higher level program.

Beside, a function for supporting a download and an application program.

Further, a matching standard roughly includes three kinds, which are a cable network matching, a matching of a subscriber terminal with a POD, and a matching of a subscriber terminal with an external apparatus. The cable network matching prescribes a signal transmitted and received at a subscriber terminal through a transmission line.

The matching of the subscriber terminal with the POD prescribes a matching signal between the subscriber terminal and the POD, and the matching of the subscriber terminal with the external apparatus prescribes a matching signal between the subscriber terminal and the external apparatus such as a TV and a video cassette recorder (VCR).

The cable network matching accepts most of "Digital Cable Network Interface Standard (SCTE 40 2001)", which is a Society of Cable Telecommunication Engineer (SCTE) standard. This matching prescribes a signal between a subscriber terminal and a cable TV network in viewpoints of a physical hierarchy characteristic, a transfer hierarchy characteristic, and service and a related protocol stack.

The Open Cable Standard prescribes transmission of service/system information of a scrambled digital channel, an EMM, data through an out-of-band channel and prescribes that SCTE 40 (2001) should use either a Digital Video Standard (DVS)167 or DVS 178.

The out-of-band transmission should be performed in both directions and both a downlink and an uplink use a quadrature phase shift keying (QPSK) modulation. A transmission speed supports 1.544 Mbps, 2.408 Mbps, 3.088 Mbps for the downlink and 0.256 Mbps, 1.544 Mbps, 3.088 Mbps for the uplink. A use frequency supports 70~130 MHz for the downlink and 5~42 MHz for the uplink. An RF channel bandwidth supports 1.0/1.5/2.0 MHz for the downlink and 0.192/1.0/2.0 MHz for the uplink.

FIG. 1 is a view illustrating a structure of a carrier recovery loop of a related art OOB receiver.

As illustrated in FIG. 1, the carrier recovery includes a feedback loop. If a carrier passes through a phase detector 1 for compensating a static phase, a final demodulation output comes out.

If this final demodulation output passes through a slicer 2, a reference signal is obtained. A phase error detector 3 calculates a phase error using this reference signal.

A phase error calculated by the phase error detector 3 is accumulated by a loop filter 4. The loop filter 4 includes a loop filter for phase 4-1 and a loop filter for frequency 4-2.

If the loop filter for phase 4-1 estimates a static phase, the phase detector 1 compensates a phase error and makes an original value. At this point, the loop filter for phase 4-1 is a short loop having a very short group delay.

The loop filter for frequency 4-2 compensates for an obtained carrier frequency offset at a front end of a demodulator. Unlike the phase detector 1, the loop filter for frequency 4-2 has a considerably long group delay. In spite of such a long loop, the loop filter for frequency 4-2 compensates for the frequency offset with a stable performance.

As described above, the loop filter 4 receives a phase error from the phase error detector 3 for its input and multiplies the phase error by a loop bandwidth and performs an accumulation. The loop bandwidth should be scaled down as time goes on, so as to converge to an accurate direction. That is, it is important to set the bandwidth in a direction that a signal-to-noise ratio (SNR) is increased.

At this point, an element for changing the bandwidth step by step as time goes on is a lock detector 7. Though there exist various lock detectors, a lock detector whose performance is perfect does not exist substantially because reaction pattern of the lock detector is different depending on channels.

Since it is substantially difficult to design the lock detector satisfying all conditions, the lock detector is designed to satisfy a considerably flexible condition so as to converge up to the last bandwidth under most of conditions, though there exists a time difference.

FIG. 2 is a graph of a shape of the frequency offset with respect to time, estimated by the loop filter, which is an index representing loop filter's characteristic.

As times goes on, a frequency offset converges to a carrier frequency offset sought for as illustrated in FIG. 2. Generally, when the frequency offset converges to a correct direction, it is observed that the frequency offset converges to the shape as illustrated in FIG. 2. However, there occurs from time to time a case that the loop filter cannot find an actual frequency offset, converging to a false point.

Particularly, such a problem is generated for a quadrature phase shift keying (QPSK) type rather than a quadrature amplitude modulation (QAM) type. A reception of the current OOB system has a QPSK structure, such a phenomenon is often generated.

More specifically, in a process for obtaining the phase error, a vague phase is generated upon slicing. With such a circumstance, the QAM type does not make such a decision as to change a sign of the phase but the QPSK type often makes such a decision as to change a sign of the phase.

SUMMARY OF THE INVENTION

Accordingly, the present invention is directed to a carrier recovery apparatus and a digital broadcast receiver using the same that substantially obviate one or more problems due to limitations and disadvantages of the related art.

An object of the present invention is to provide a carrier recovery apparatus and a digital broadcast receiver using the same capable of improving carrier recovery so as to provide optimized performance under a cable channel circumstance.

Another object of the present invention is to improve carrier recovery to enhance performance of an OOB QPSK system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a carrier recovery apparatus includes: a carrier recovery for receiving a digital broadcast signal, multiplying the signal by a carrier frequency offset, and compensating a distorted phase before converting into a last bandwidth; an SNR calculator for obtaining an average in an interval determined by accumulating an inputted inter-symbol mean squared error (MSE) to calculate an SNR; a false lock detector for receiving the SNR calculated at the SNR calculator for its input to generate a false reset signal for preventing a frequency offset from converging to a false direction before converting into a last bandwidth of a lock detector; and an integrator for receiving a false reset signal from the false lock detector, for its input to initialize a register of an integral part representing a frequency offset component of a loop filter.

The SNR calculator may include: an MSE calculator for calculating an inter-symbol MSE using a received digital broadcast signal and an output obtained by slicing the digital broadcast signal; an MSE accumulator for accumulating inter-symbol MSEs calculated by the MSE calculator for a plurality of cycles; and an average block for calculating an average of the MSEs accumulated by the MSE accumulator to obtain an SNR.

The MSE accumulator may accumulate inter-symbol MSEs for 16,000-130,000 cycles.

The false lock detector may include: a comparator for comparing a SNR inputted from the SNR calculator with a predetermined reference SNR; and a false lock generator for generating a false reset signal if it is judged that convergence is performed to a false direction as a result of comparison at the comparator.

The false lock detector may further include a counter for counting the number of convergence to the false direction and having the false lock generator generate the false reset signal if the number of convergence is more than a predetermined number of times.

In another aspect of the present invention, a carrier recovery apparatus includes: a phase detector for compensating a static phase; a slicer for obtaining a reference signal from a final demodulation signal outputted from the phase detector; a phase error detector for computing a phase error using the reference signal of the slicer; a loop filter for accumulating the computed phase error; a lock detector for multiplying and accumulating, at the loop filter, a phase error of the phase error detector by a loop bandwidth to change the multiplied and accumulated phase error into a gradual bandwidth as time goes on; an SNR calculator for obtaining an average in an interval determined by accumulating inter-symbol mean squared error (MSE) inputted from the phase detector to compute an SNR; a false lock detector for receiving the SNR calculated at the SNR calculator for its input to generate a false reset signal for preventing convergence from being performed to a false direction before converting into a last bandwidth of a lock detector; and an integrator for displaying a frequency offset component of a loop filter and receiving a false reset signal from the false lock detector, for its input to initialize a register of an integral part.

In further another aspect of the present invention, a digital broadcast receiver using a carrier recovery apparatus includes: an analog/digital (A/D) converter for sampling a signal outputted from an analog front end with a sampling rate; a phase divider for dividing data inputted from the A/D converter into I and Q signals; a complex multiplier for multiplying the I and Q signals by an output of a carrier recovery loop signal to lower the same to a baseband; a resampler for resampling the base band signal; a matching filter for performing a matching filtering at a rear of the resampler to complete a phase shaping; a channel equalizer for lowering the completed baseband phase shaping using a symbol rate to perform division; a carrier recovery having the above-described structure; and a timing recovery for determining an interpolation point of a finite impulse response filter using the baseband phase shaping completed at the matching filter.

The digital broadcast receiver may be a QAM type or a QPSK type.

The digital broadcast receiver may be an OOB system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
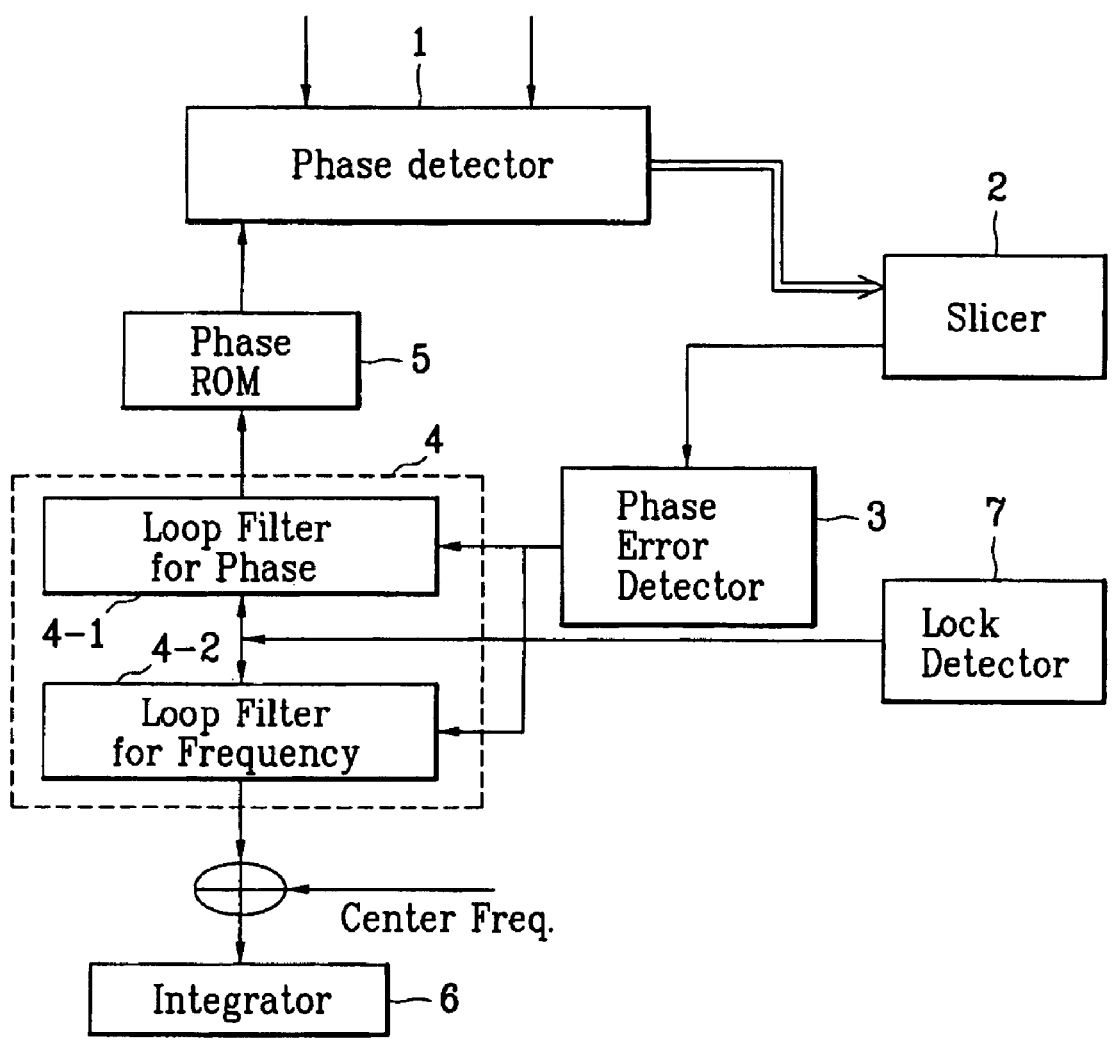
FIG. 1 is a view illustrating a structure of a carrier recovery loop of a related art OOB receiver.
Figure 2:
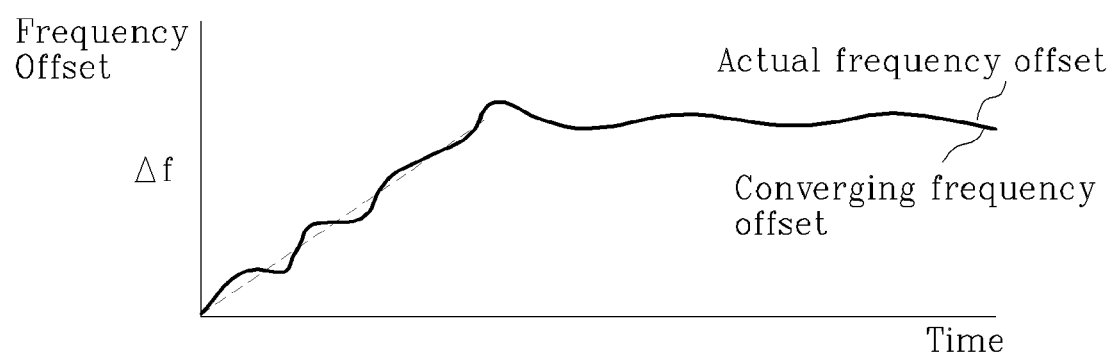
FIG. 2 is a graph of a shape of the frequency offset with respect to time, estimated by a related art carrier recovery loop filter.
Figure 3:
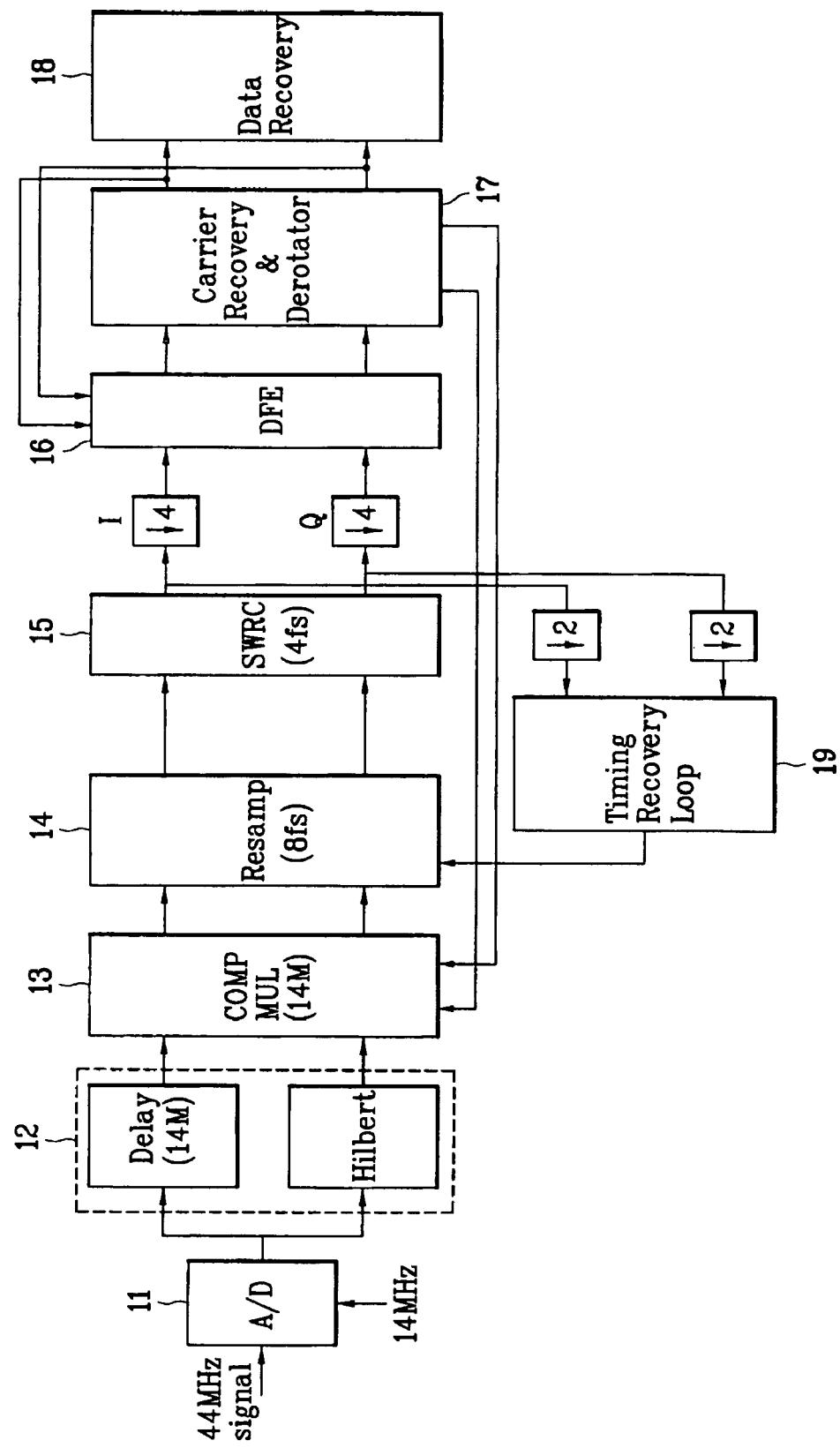
FIG. 3 is a view illustrating a structure of an OOB QPSK receiver according to the present invention.

FIG. 3 is a view illustrating a structure of an OOB QPSK receiver according to the present invention.

Referring to FIG. 3, an OOB receiver for carrier recovery includes: an A/D converter 11; a phase divider 12 for dividing data outputted from the A/D converter 11 into I and Q signals; a complex multiplier 13 for multiplying the I and the Q signals by a carrier recovery loop signal output to lower the same to a baseband; a resampler 14 for resampling the baseband signal; a matching filter 15 for performing, at a rear of the resampler 14, a matched filtering to complete a baseband phase shaping; a channel equalizer 16 for lowering the completed baseband phase shaping using a symbol rate to perform division; a carrier recovery/phase derotator 17 for multiplying, at a rear of the channel equalizer 16, a carrier frequency offset for carrier recovery and compensating a distorted phase; a timing recovery 19 for determining an interpolation point of a finite impulse response filter using the baseband phase shaping completed at the matching filter.

In operation, if a signal lowered down to 44 MHz is outputted at an analog front end of the A/D converter 11, the A/D converter 11 receives this signal to perform sampling of data using a sampling rate of 14 MHz.

The phase divider 12 divides this signal into I and Q signals.

The complex multiplier multiplies the I and the Q signals by a signal output of the carrier recovery 17 that has started at a rear of the channel equalizer 16 to lower a signal of 2 MHz to a baseband.

The resampler 14 performs a resampling using this baseband signal. At this time, the performing of the resampling also determines an interpolation point of a finite impulse response filter using a value obtained by adding a timing offset calculated by a loop output of the timing recovery 19, to a ratio of a sampling rate suitable for each QPSK mode (0.772 Msps/1.024 Msps/1.544 Msps) and a fixed clock rate, so that an output is provided with an eight times faster clock than an actual symbol rate.

The matching filter 15 performs a matched filtering using this output value to complete a baseband pulse shaping. The channel equalizer lowers the baseband pulse shaping using a symbol rate to perform equalizing.

After that, the carrier recovery/phase derotator 17 starts to perform carrier recovery at a rear of the channel equalizer 16 and multiplies a carrier frequency offset at a rear of a phase splitter.

Further, the carrier recovery/phase derotator 17 generates a short loop to remove a residual carrier phase jitter and compensates for a distorted phase at a rear of the channel equalizer 16.

Demodulation is completed in this manner and a differential decoder provides final data in an order of I and Q to a point of deployment (POD).

At this point, the channel equalizer 16 uses an output of the matching filter 12 for a feed forward input and uses an output of a phase derotator 17 for a feed back input. An error for updating a coefficient of the channel equalizer 16 is calculated using an output of the derotator 17.

Since a delay is generated while a process is proceeded up to an output of the derotator 17 under the described structure, several pipelines are generated in updating a coefficient but the delay to this extent does not influence a performance of the channel equalizer very much. In case of the OOB QPSK system, an optimized performance is expected with a minimum delay generated since a symbol rate is considerably low.

Figure 4:
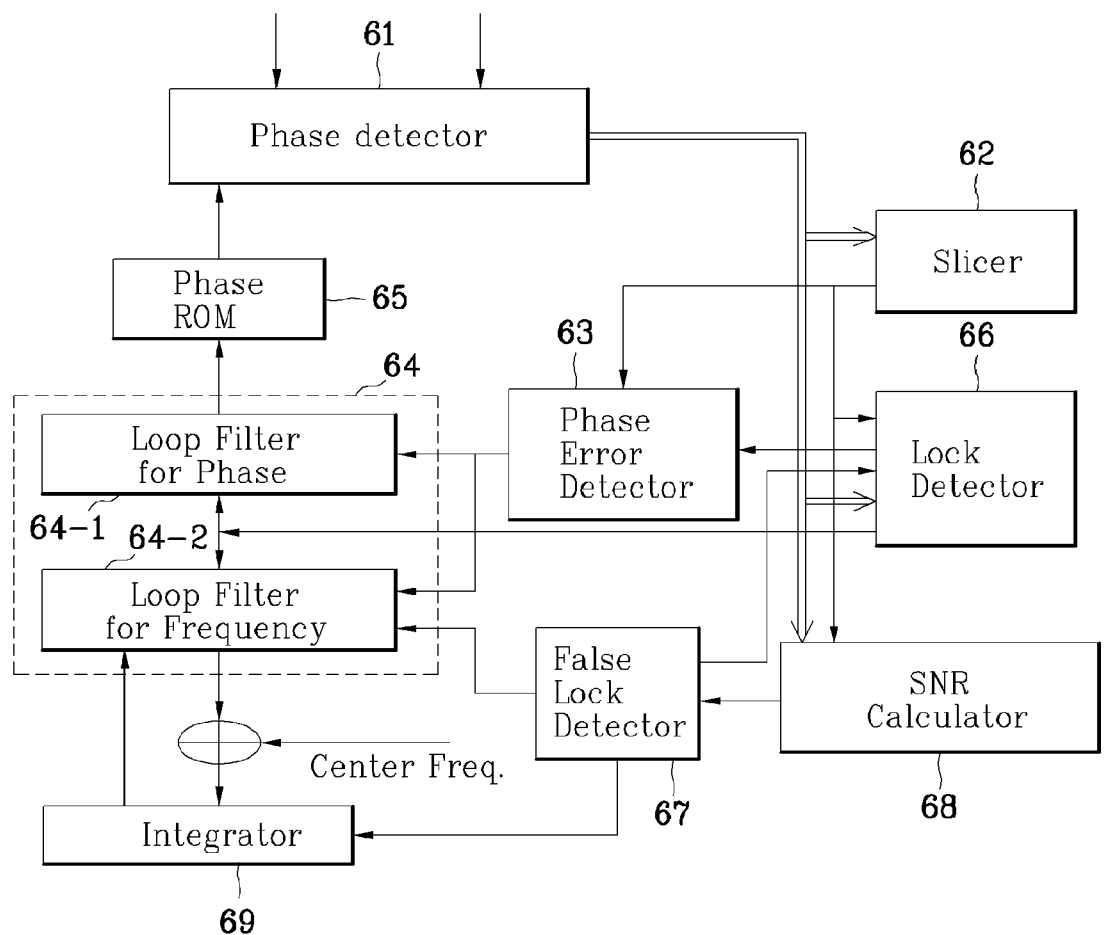
FIG. 4 is a view illustrating a structure of a carrier recovery of an OOB QPSK receiver according to the present invention.

FIG. 4 is a view illustrating a structure of a carrier recovery of an OOB QPSK receiver according to the present invention. Referring to FIG. 4, the carrier recovery includes: a phase detector 61 for compensating a static phase; a slicer 62 for obtaining a reference signal from a final demodulation signal outputted from the phase detector 61; a phase error detector 63 for calculating a phase error using the reference signal of the slicer 62; a loop filter 64 for accumulating the calculated phase error; a lock detector 66 for multiplying and accumulating, at the loop filter 64, a phase error of the phase error detector 63 by a loop bandwidth to change the multiplied and accumulated phase error into a gradual bandwidth as time goes on; a false lock detector 67 for preventing a frequency offset from converging to a false direction before converting into a last bandwidth of a lock detector 66; an SNR calculator 68 for obtaining an average in an interval determined by accumulating a mean squared error (MSE) from the phase detector 61 to calculate an SNR; and an integrator 69 for initializing a register of a integral part displaying a frequency offset component of the loop filter.

In operation, the carrier recovery is formed by a feedback loop. Since a signal passes through the phase detector 61 for compensating a static phase, a final demodulation output comes out.

A reference signal is obtained by passing this final demodulation output through the slicer 62 and the phase error detector 63 calculates a phase error using this reference signal.

The loop filter 64 accumulates the phase error calculated at the phase error detector. The loop filter 64 is divided into a loop filter for phase 64-1 and a loop filter for frequency 64-2.

A static phase is estimated using an output of the loop filter for phase 64-1 and the phase detector 61 compensates a phase to an original phase through the phase read-only-memory (ROM) 65. At this point, the loop of the loop filter for phase 64-1 is a short loop having a very short group delay.

Further, the loop filter for frequency 64-2 compensates for an obtained carrier frequency offset at a front end of a demodulator. Unlike the phase detector 61, the loop filter for frequency 64-2 has a considerably long group delay. In spite of such a long loop, the loop filter for frequency 64-2 compensates the frequency offset with a stable performance.

Subsequently, the loop filter 64 receives a phase error from the phase error detector 63 for its input and multiplies the phase error by a loop bandwidth and performs an accumulation. The loop filter bandwidth should be scaled down as time goes on, so as to converge to an accurate direction. That is, it is important to set the bandwidth in a direction that a signal-to-noise ratio (SNR) is increased.

The lock detector 66 changes a bandwidth step by step as time goes on and the false lock detector 67 generates, through the SNR calculator 68, a false reset signal before converting to a last bandwidth in order to prevent a frequency offset from converging to a false direction and initializes the register 69 of the integral part displaying a frequency offset component of the loop filter for frequency 64-2. A signal, Center Freq. is input to the integrator 69 for compensating a default center frequency. The default center frequency may be a frequency predetermined according to a tuner.

Figure 5:
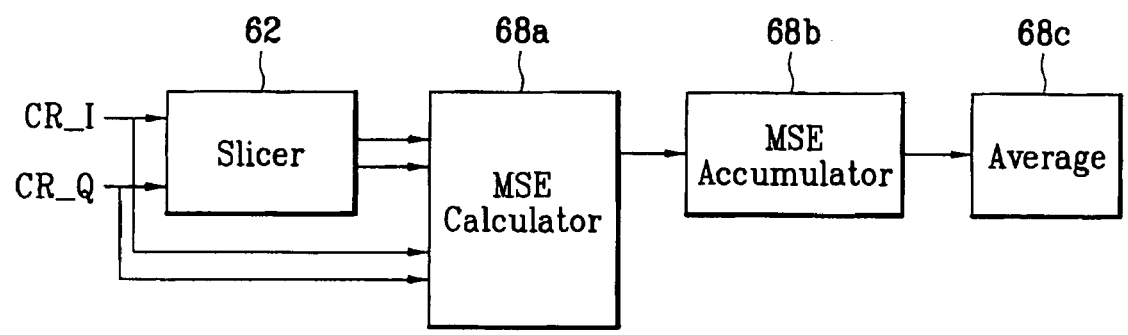
FIG. 5 is a view illustrating an SNR calculator of a carrier recovery of an OOB QPSK receiver according to the present invention.

FIG. 5 is a block diagram illustrating a structure of an SNR calculator of a carrier recovery according to the present invention. The SNR calculator includes an MSE calculator 68a, an MSE accumulator 68b, and an average block 68c.

Operation of the SNR calculator will be described with reference to FIG. 5. To calculate an SNR, an MSE is obtained first.

For obtaining an MSE, an output of the phase detector 61 is received and sliced at the slicer 62 so as to be a reference.

The MSE calculator 68a obtains an absolute value of a difference between the sliced value and an output value of the phase detector 61 and squares each term of the I and the Q to add them each other. At this point, the sliced value cannot be an exact reference initially but the MSE calculator 68a gradually reaches a reference and can obtain a reliable value while converging to a predetermined value.

After a measure for an interval determined by accumulating the MSE obtained in this manner through the MSE accumulator 68b is calculated, the average block 68c obtains an average to obtain a final SNR. At this point, for obtaining a reliable SNR, the MSE accumulator 68b accumulates input symbols for 16,000-130,000 cycle, preferably for 65536 cycle, and then the average block 68c obtains an average.

The accumulation range of the MSE accumulator 68b is not limited to the above range of 16,000-130,000 cycle and can be arbitrarily changed by a person of ordinary skill in the art.

The SNR obtained at the SNR calculator 68 in this manner is inputted to the false lock detector 67, which is the next end.

Figure 6:
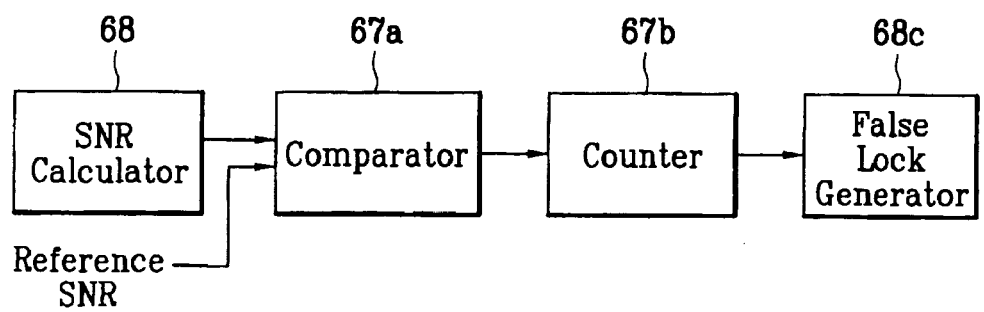
FIG. 6 is a view illustrating a false lock detector of a carrier recovery of an OOB QPSK receiver according to the present invention.
Figure 7:
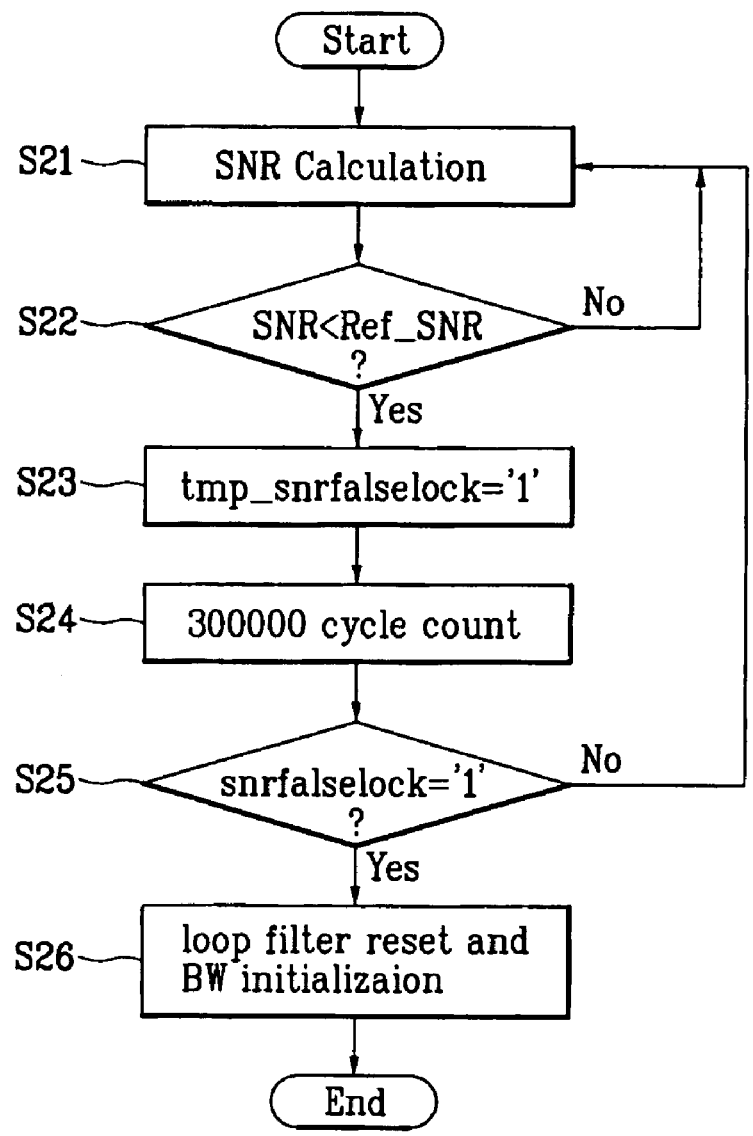
FIG. 7 is a flowchart illustrating a process for detecting a false lock according to FIG. 6.

FIG. 6 is a block diagram illustrating a false lock detector of a carrier recovery according to the present invention. The false lock detector includes a comparator 67a, a counter 67b, and a false lock generator 67c. FIG. 7 is a flowchart illustrating a detection process by the false lock detector of FIG. 6.

Referring to FIGS. 6 and 7, the SNR inputted from the SNR calculator 68 is compared with a Ref_SNR, which is a predetermined reference SNR, through the comparator 67a.

If the inputted SNR is grater than the Ref_SNR as a result of the comparison at the comparator 67a, it is judged as a normal convergence. On the contrary, if the inputted SNR is smaller than the Ref_SNR as a result of the comparison, a frequency offset is judged to converge to a false direction.

If the frequency offset is judged to converge to a false direction as a result of the judgment, tmp_snrfalselock (not shown) within the false lock detector 67 is set to '1'. At this point, the tmp_snrfalselock normally maintains '0' constantly and is set to '1' in case the frequency offset converges to a false direction.

The counter 67b counts the number of times a value of the tmp_snrfalselock is set to '1'. If a setting value of the tmp_sn-rfalselock comes to have '1' continuously as much as the number of times set in advance in the counter 67b, a snrfalselock (not shown) within the false lock detector 67 is set to '1'.

If the snrfalselock is set to '1', the false lock detector 67 generates a false reset signal through the false lock generator 67c and transmits the same to the integrator 69 of the loop filter.

Then, the integrator 69 initializes the register of the integral part and sets the bandwidth to an initial value depending on a false reset signal.

At this point, the reason why the counter 67b is provided is that if the integrator 69 is initialized in a period of 65,536 cycle at which the tmp_snrfalselock's value is set to '1', the register of the integral part is initialized even by a small convergence error and a convergence speed of the system gets very slow.

Therefore, the present invention solves the problem that the register of the loop filter is initialized even due to a small convergence error by adding the counter 67b and setting the snrfalselock to '1' only in case the tmp_snrfalselock='1' is continuously satisfied after performing the counting for 300,000 cycle where a period of 65,536 cycle is repeated about four or five times.

At this point, the number of times for the period of the cycle set to the counter 67b is not limited to four or five times and can be arbitrarily changed by a person of ordinary skill in the art.

According to the present invention, it is possible to achieve a considerable improvement in a pull-in range, which is an important item of carrier recovery, while not greatly damaging a system convergence speed by starting again a frequency offset tracking converging to a false direction.

Also in actual experiment results, the pull-in range has been measured as −75 kHz~75 kHz, −45 kHz~45 kHz, −35 kHz~35 kHz for 1.544 Msps, 1.024 Msps, 0.772 Msps, respectively, which shows a remarkable improvement of performance not comparable with a case in which the false lock detector is not applied.

As described above, the present invention has advantages of performance improvement in the resampler and a relatively low burden of a hardware.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A carrier recovery apparatus comprising:
    a carrier recovery for receiving a digital broadcast signal, multiplying the received signal by a carrier frequency offset, and compensating a distorted phase before converting into a last bandwidth;
    an SNR (signal-to-noise ratio) calculator for obtaining an average in an interval determined by accumulating an input inter-symbol mean squared error (MSE) to calculate an SNR;
    a false lock detector for receiving the SNR calculated by the SNR calculator in order to generate a false reset signal for preventing a frequency offset from converging to a false direction before converting into a last bandwidth of a lock detector; and
    an integrator for receiving the false reset signal from the false lock detector in order to initialize a register of an integral part representing a frequency offset component of a loop filter.

2. The carrier recovery apparatus of claim 1, wherein the SNR calculator comprises:
   an MSE calculator for calculating an inter-symbol MSE using a received digital broadcast signal and an output obtained by slicing the digital broadcast signal;
   an MSE accumulator for accumulating inter-symbol MSEs calculated by the MSE calculator for a plurality of cycles; and
   an average block for calculating an average of the MSEs accumulated by the MSE accumulator to obtain an SNR.

3. The carrier recovery apparatus of claim 2, wherein the MSE accumulator accumulates the inter-symbol MSEs for 16,000-130,000 cycles.

4. The carrier recovery apparatus of claim 2, wherein the MSE accumulator accumulates the inter-symbol MSEs for 65,536 cycles.

5. The carrier recovery apparatus of claim 1, wherein the false lock detector comprises:
   a comparator for comparing an SNR input from the SNR calculator with a predetermined reference SNR; and
   a false lock generator for generating the false reset signal if a frequency offset is determined to converge to a false direction as a result of the comparison by the comparator.

6. The carrier recovery apparatus of claim 5, wherein the false lock detector judges a normal convergence if the inputted SNR is greater than the reference SNR as a result of the comparison at the comparator and judges that a frequency offset converges to a false direction if the inputted SNR is smaller than the reference SNR as a result of the comparison.

7. The carrier recovery apparatus of claim 5, wherein the false lock detector further comprises:
   a counter for counting the number of convergence to the false direction and having the false lock generator generate the false reset signal if the number of convergence is more than a predetermined number of times.

8. The carrier recovery apparatus of claim 7, wherein the predetermined number of times is four or five times.

9. A carrier recovery apparatus comprising:
   a phase detector for compensating a static phase;
   a slicer for obtaining a reference signal from a final demodulation signal output from the phase detector;
   a phase error detector for calculating a phase error using the reference signal of the slicer;
   a loop filter for accumulating the calculated phase error;
   a lock detector for multiplying and accumulating, at the loop filter, the phase error of the phase error detector by a loop bandwidth to change the multiplied and accumulated phase error into a gradual bandwidth over time;
   an SNR (signal-to-ratio) calculator for obtaining an average in an interval determined by accumulating an inter-symbol MSE (mean squared error) input from the phase detector to calculate an SNR;
   a false lock detector for receiving the SNR calculated by the SNR calculator in order to generate a false reset signal for preventing a frequency offset from converging to a false direction before converting into a last bandwidth of the lock detector; and
   an integrator for receiving the false reset signal from the false lock detector in order to initialize a register of an integral part representing a frequency offset component of the loop filter.

10. The carrier recovery apparatus of claim 9, wherein the SNR calculator comprises:
    an MSE calculator for calculating an inter-symbol MSE using a value sliced at the slicer and an output value of the phase detector;
    an MSE accumulator for accumulating inter-symbol MSEs calculated by the MSE calculator for a plurality of cycles; and
    an average block for calculating an average of the MSEs accumulated by the MSE accumulator to obtain an SNR.

11. The carrier recovery apparatus of claim 10, wherein the MSE calculator calculates the inter-symbol MSE by obtaining an absolute value of a difference between the sliced value and an output value of the phase detector and squaring each term of I and Q to add them each other.

12. The carrier recovery apparatus of claim 10, wherein the MSE accumulator accumulates the inter-symbol MSEs for 16,000-130,000 cycles.

13. The carrier recovery apparatus of claim 10, wherein the MSE accumulator accumulates the inter-symbol MSEs for 65,536 cycles.

14. The carrier recovery apparatus of claim 9, wherein the false lock detector comprises:
    a comparator for comparing the SNR input from the SNR calculator with a predetermined reference SNR; and
    a false lock generator for generating the false reset signal if a frequency offset is determined to converge to a false direction as a result of the comparison by the comparator.

15. The carrier recovery apparatus of claim 14, wherein the false lock detector judges a normal convergence if the inputted SNR is greater than the reference SNR as a result of the comparison at the comparator and judges that a frequency offset converges to a false direction if the inputted SNR is smaller than the reference SNR as a result of the comparison.

16. The carrier recovery apparatus of claim 14, wherein the false lock detector further comprises:
    a counter for counting the number of convergence to the false direction and having the false lock generator generate the false reset signal if the number of convergence is more than a predetermined number of times.

17. The carrier recovery apparatus of claim 16, wherein the predetermined number of times is four or five times.

18. A digital broadcast receiver comprising:
    an A/D (analog/digital) converter for sampling a signal output from an analog front end with a sampling rate;
    a phase divider for dividing data input from the A/D converter into I and Q signals;
    a complex multiplier for multiplying the I and the Q signals by an output of a carrier recovery loop signal to lower the I and the Q signals to a baseband signal;
    a resampler for resampling the baseband signal;
    a matching filter for performing a matching filtering at a rear of the resampler to complete a baseband phase shaping;
    a channel equalizer for lowering the completed baseband phase shaping using a symbol rate to perform division;
    a carrier recovery apparatus; and
    a timing recovery for determining an interpolation point of a finite impulse response filter using the completed baseband phase shaping,
    wherein the carrier recovery apparatus comprises:
      a carrier recovery for receiving a digital broadcast signal, multiplying the received signal by a carrier frequency offset, and compensating a distorted phase before converting into a last bandwidth;
      an SNR (signal-to-noise ratio) calculator for obtaining an average in an interval determined by accumulating an input inter-symbol mean squared error (MSE) to calculate an SNR;
      a false lock detector for receiving the SNR calculated by the SNR calculator in order to generate a false reset signal for preventing a frequency offset from converging to a false direction before converting into a last bandwidth of a lock detector; and an integrator for receiving the false reset signal from the false lock detector in order to initialize a register of an integral part representing a frequency offset component of a loop filter.

19. The digital broadcast receiver of claim 18, wherein the digital broadcast receiver is a QAM (Quadrature Amplitude Modulation) type, or a QPSK (Quadrature Phase Shift Keying) type.

20. The digital broadcast receiver of claim 18, wherein the digital broadcast receiver is an OOB (out-of-band) system.

21. A digital broadcast receiver comprising:

an A/D (analog/digital) converter for sampling a signal outputted from an analog front end with a sampling rate;

a phase divider for dividing data input from the A/D converter into I and Q signals;

a complex multiplier for multiplying the I and the Q signals by an output of a carrier recovery loop signal to lower the I and the Q signals to a baseband signal;

a resampler for resampling the baseband signal;

a matching filter for performing a matching filtering at a rear of the resampler to complete a baseband phase shaping;

a channel equalizer for lowering the completed baseband phase shaping using a symbol rate to perform division;

a carrier recovery apparatus; and a timing recovery for determining an interpolation point of a finite impulse response filter using the completed baseband phase shaping, wherein the carrier recovery apparatus comprises:

a phase detector for compensating a static phase;

a slicer for obtaining a reference signal from a final demodulation signal output from the phase detector;

a phase error detector for calculating a phase error using the reference signal of the slicer;

a loop filter for accumulating the calculated phase error;

a lock detector for multiplying and accumulating, at the loop filter, the phase error of the phase error detector by a loop bandwidth to change the multiplied and accumulated phase error into a gradual bandwidth over time;

an SNR (signal-to-ratio) calculator for obtaining an average in an interval determined by accumulating an inter-symbol MSE (mean squared error) input from the phase detector to calculate an SNR;

a false lock detector for receiving the SNR calculated by the SNR calculator in order to generate a false reset signal for preventing a frequency offset from converging to a false direction before converting into a last bandwidth of the lock detector; and an integrator for receiving the false reset signal from the false lock detector in order to initialize a register of an integral part representing a frequency offset component of the loop filter.

22. The digital broadcast receiver of claim 21, wherein the digital broadcast receiver is a QAM (Quadrature Amplitude Modulation) type, or a QPSK (Quadrature Phase Shift Keying) type.

23. The digital broadcast receiver of claim 21, wherein the digital broadcast receiver is an OOB (out-of-band) system.

* * * * *